United States Patent
Turicchi, Jr. et al.

(10) Patent No.: US 6,671,658 B2
(45) Date of Patent: Dec. 30, 2003

(54) METHOD FOR SERVICE LEVEL ESTIMATION IN AN OPERATING COMPUTER SYSTEM

(75) Inventors: Thomas Edwin Turicchi, Jr., Dallas, TX (US); Doug Grumann, Citrus Heights, CA (US)

(73) Assignee: Hewlett-Packard Development Company, L.P, Houston, TX (US)

( * ) Notice: Subject to any disclaimer, the term of this patent is extended or adjusted under 35 U.S.C. 154(b) by 269 days.

(21) Appl. No.: 09/745,949

(22) Filed: Dec. 23, 2000

(65) Prior Publication Data

US 2002/0082807 A1 Jun. 27, 2002

(51) Int. Cl.$^7$ ................................................. G06F 11/30
(52) U.S. Cl. ..................................................... 702/186
(58) Field of Search ............................... 702/186, 182, 702/183, 104, 176; 707/201, 224; 709/228; 395/500.05; 713/600, 322; 24/603; 703/2

(56) References Cited

U.S. PATENT DOCUMENTS

| | | | |
|---|---|---|---|
| 5,465,354 A | | 11/1995 | Hirosawa et al. |
| 5,537,542 A | | 7/1996 | Eilert et al. |
| 5,797,115 A | * | 8/1998 | Fuller .......................... 702/186 |
| 5,808,221 A | * | 9/1998 | Ashour et al. ................. 84/603 |
| 6,086,618 A | * | 7/2000 | Al-Hilali et al. ............... 703/2 |
| 6,341,285 B1 | * | 1/2002 | Blott et al. ................... 707/201 |
| 6,397,340 B2 | * | 5/2002 | Watts et al. .................. 713/322 |
| 6,438,704 B1 | * | 8/2002 | Harris et al. ................. 713/502 |
| 2001/0044909 A1 | * | 11/2001 | Oh et al. ..................... 713/600 |
| 2002/0026291 A1 | * | 2/2002 | Lee et al. .................... 702/186 |

FOREIGN PATENT DOCUMENTS

EP 0 762 286 * 12/1997

OTHER PUBLICATIONS

PAJ Abstract & JP O80082685 A (Nippon Avionics).

* cited by examiner

*Primary Examiner*—John Barlow
*Assistant Examiner*—Tung S Lau

(57) ABSTRACT

A method for obtaining an estimate of response time for a typical transaction request in a computer system under varying load conditions. This estimate can be compared to a predefined value considered by the system administrator to be the level at which the response time becomes significantly degraded, thereby providing a measure of the operating condition of the computer system. Preliminary measurements include measurement of response time for the typical transaction request while the computer system is lightly loaded, CPU usage, and response times for more than one concurrent typical transaction request. During computer system operation only the number of concurrent transaction requests and the total CPU usage need to be obtained and measured. A primary advantage of the embodiments as described in the present patent document over prior methods is that the present methods can provide a more accurate approximation of actual response-time under varying loads while consuming less system resources to do so.

6 Claims, 3 Drawing Sheets

METHOD FOR SERVICE LEVEL ESTIMATION IN AN OPERATING COMPUTER SYSTEM

FIELD OF THE INVENTION

The present invention relates generally to computer systems and, more particularly, to the estimation of service level which computer systems provide processes running on them.

BACKGROUND OF THE INVENTION

The most important metric which an administrator of a modern computer system is interested in for a particular service is the time which the computer system takes to fulfill a request for service from a process running on that computer system. This time is referred to as the response time or service level and is often an average of many such requests by the same process. Unfortunately, as is often the case, the measurement of response time is difficult, if not impossible, for applications for which the source code is unavailable. Response time is the total clock time that it takes for the computer system to service the request which includes both active computer time as well as any wait times.

One solution to this problem is to create "dummy" transactions and then measure the response-time of these. However, this technique is highly inaccurate and tends to underestimate the actual response-time. Data resulting from the dummy transaction requests tend to be cached as the same transactions may be being requested over and over again, whereas the user's data may or may not be cached. Thus, response-times for the dummy transactions are often frequently much faster than response-times that would be observed in normal operation.

Thus, there is a need for a method by which a more representative value for the response time for a process running on a computer system can be obtained even when the source code for the process is unavailable.

SUMMARY OF THE INVENTION

The present patent document relates to a novel method for obtaining an estimate of service level in an operating computer system. This estimate can be compared to a predefined level of significant service level degradation thereby providing the system administrator a measure of the operating condition of the computer system. Previous methods for obtaining such a measure have relied upon creating dummy transactions and measuring their response time. Due to data caching values obtained by this technique are often faster than those obtainable.

In representative embodiments, methods are disclosed which require the following inputs from the user: (1) An optimal response-time of a typical transaction. The optimal response-time can be measured by timing a typical transaction on a lightly loaded system. This value is defined to be the optimal response time, and is the fastest response time that could be expected from the computer system for that typical transaction or transactions. Alternatively, the response times of several representative transactions could be measured on the lightly loaded system with a composite average of those results being identified as the optimal response-time. Measurements on the more heavily loaded system, would result in a longer response time. (2) A central processing unit (CPU) usage required of a typical transaction. This value can also be measured by executing a known number of transactions while measuring the actual CPU usage. (3) The number of concurrent transactions that can be completed for the typical transaction before system performance degrades by some predetermined value.

As the computer system operates it experiences a variety of load conditions. Using the methods disclosed in the present patent document, an estimated system response time is obtained which can be used by the system administrator to gage the system's effectiveness in completing the tasks assigned to it under these varying load conditions. Two items are measured as the system operates: (1) the number of outstanding transaction requests and (2) the system CPU utilization. Given the three inputs from the user, the response-time that the end-user experiences can be approximated using the number of outstanding requests, and the CPU utilization.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

1. Introduction

Figure 1:
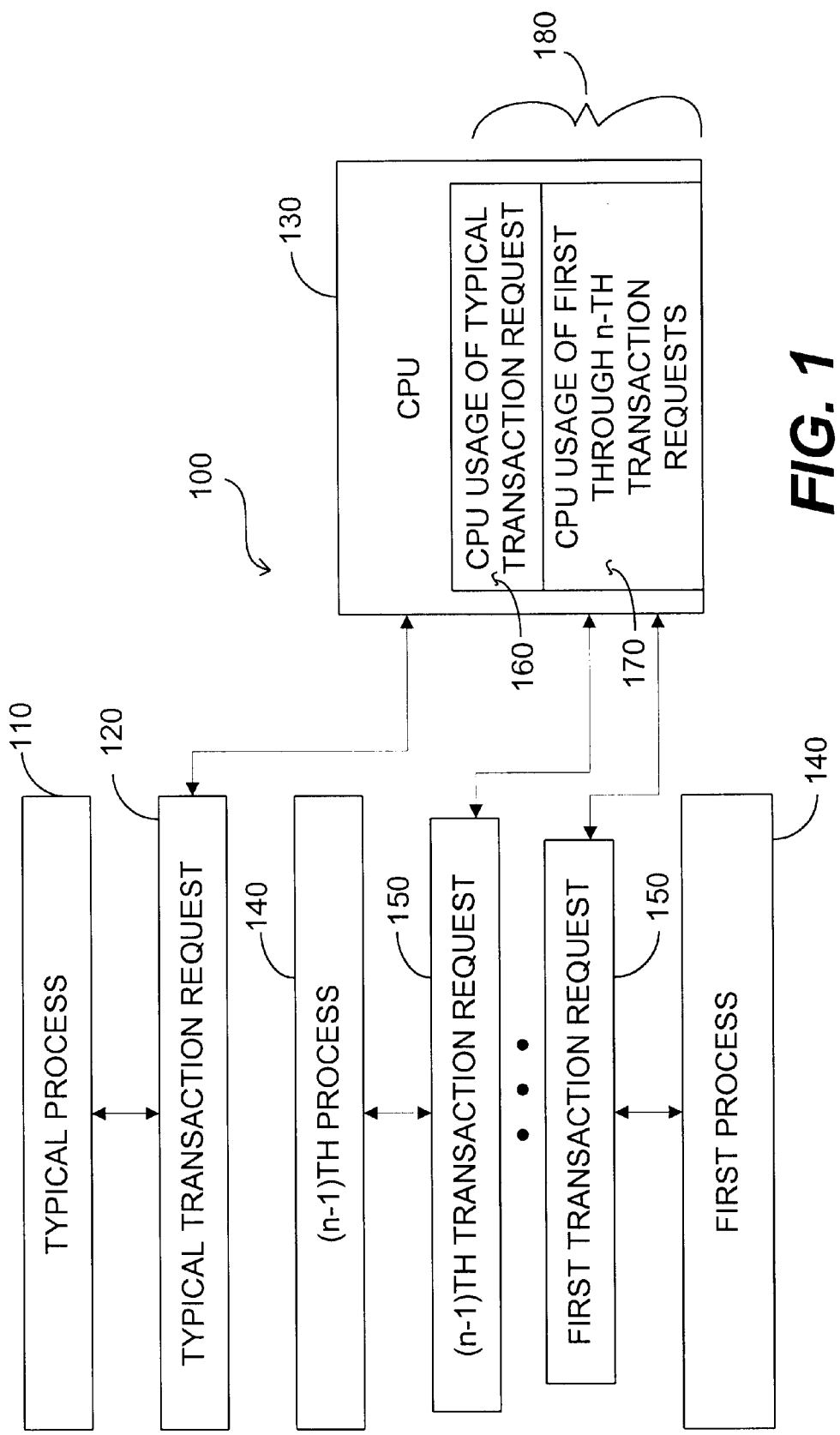
FIG. 1 is a drawing of a computer system as described in various representative embodiments of the present patent document.

As shown in the drawings for purposes of illustration, the present patent document relates to a novel method for obtaining an estimate of service level in an operating computer system. This estimate can be compared to a predefined level of significant service level degradation thereby providing the system administrator a measure of the operating condition of the computer system. Previous methods for obtaining such a measure have relied upon creating dummy transactions and measuring their response time. Due to data caching values obtained by this technique are often faster than those obtainable.

In the following detailed description and in the several figures of the drawings, like elements are identified with like reference numerals.

2. Discussion

In representative embodiments, methods are disclosed which require the following inputs from the user: (1) An optimal response-time of a typical transaction. The optimal response-time can be measured by timing a typical transaction on a lightly loaded system. This value is defined to be the optimal response time, and is the fastest response time that could be expected from the computer system for that typical transaction or transactions. Alternatively, the response times of several representative transactions could be measured on the lightly loaded system with a composite average of those results being identified as the optimal response-time. Measurements on the more heavily loaded system, would result in a longer response time. (2) A central processing unit (CPU) usage required of a typical transaction. This value can also be measured by executing a known number of transactions while measuring the actual CPU usage. (3) The number of concurrent transactions that can be completed for the typical transaction before system performance degrades by some predetermined value.

As the computer system operates it experiences a variety of load conditions. Using the methods disclosed in the present patent document, an estimated system response time is obtained which can be used by the system administrator to gage the system's effectiveness in completing the tasks assigned to it under these varying load conditions. Two items are measured as the system operates: (1) the number of outstanding transaction requests and (2) the system CPU utilization. Given the three inputs from the user, the response-time that the end-user experiences can be approximated using the number of outstanding requests, and the CPU utilization.

FIG. 1 is a drawing of a computer system 100 as described in various representative embodiments of the present patent document. In the example of FIG. 1, a typical process 110 makes a typical transaction request 120 of central processing unit (CPU) 130. Process 110 and its transaction request 120 are selected by the system administrator to be representative or typical of those expected to be run on the computer system 100. At any particular time, the typical transaction request 120 may or may not have been made of the CPU 130 and the typical process 110 may or may not be active on the computer system 100. Also shown in FIG. 1 are other processes 140 indicatedas first through (n–1)th processes 140 which are active in this example on the computer system 100 and have respectively outstanding other transaction requests 150 indicated respectively as first through (n–1)th transaction requests 150. Each transaction request 120,150 consumes CPU 130 resources. In particular, the typical transaction request 120 consumes a typical CPU usage 160, also referred to herein as a first CPU usage 160, wherein the typical CPU usage 160 is that portion of the CPU used is fulfilling the typical transaction request 120, and other outstanding transaction requests 150 consume other CPU usage 170, wherein the other CPU usage 170 is that portion of the CPU used in fulfilling the other transaction requests 150 which is the first through the (n–1)th transaction requests 150. The total CPU resource consumed is shown in FIG. 1 as a total CPU usage 180.

Figure 2:
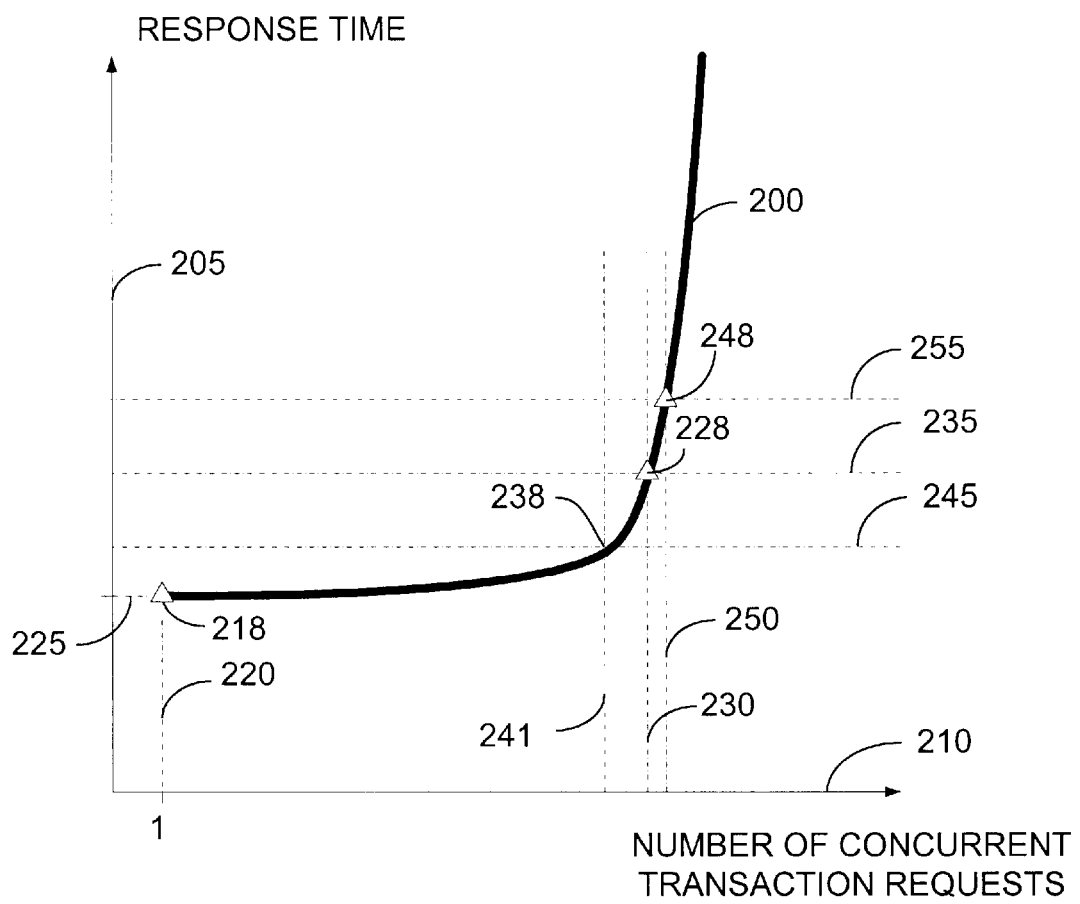
FIG. 2 is a drawing of a graph of response time vs. number of concurrent transaction requests on a computer system as described in various representative embodiments of the present patent document.

FIG. 2 is a drawing of a graph of response time 205 vs. number of concurrent transaction requests 210 on a computer system 100 as described in various representative embodiments of the present patent document. Curve 200 of FIG. 2 is created by making several measurements of system response time 205 averaged for various numbers of concurrent transaction requests 210, wherein the transaction requests 210 are typical of those normally run on the computer system 100. There are numerous means of representing such measurements with FIG. 2 being one of these. Other means include, for example, a table of numbers. It will be recognized by one skilled in the art that the curve 200 of FIG. 2 represents an approximation to the discreet set of measured data points.

First point 218 represents the measurement of a single 220 typical transaction request 120 with the computer system 100 lightly loaded. Plotted response time 225 is also referred to herein as first response time 225 and is optimal response time 225 for the typical transaction request 120.

The curve 200 is extended by making measurements as needed of at least one additional point 228, wherein the response time 205 plotted is referred to herein as second response time 235 and is the average response time for a second number 230 of concurrent typical transaction requests 120 comprising more than one typical transaction requests 120.

The significance of a third point 238, effective number 241 of concurrent transaction requests 120, and third response time 245, also referred to herein as an estimated response time 245, will be explained in the following with the discussion of FIG. 3.

At some point on the curve 200 as more and more concurrent typical transaction requests 210 are made, the response time begins to degrade significantly becoming longer and longer, until as indicated by a fourth point 248 a fourth number 250 of concurrent typical transaction requests 120 results in a significantly degraded response time 255, also referred to as a fourth response time. This significantly degraded response time 255 is defined by the system administrator as being the level of concern and one at which appropriate action should be taken to prevent further response time degradation, which could be for example by limiting further access to the computer system 100 until the current work load has decreased. If this situation continues to occur, the system administrator can plan for enhancements to the system 100 to reduce such reoccurrences.

Figure 3:
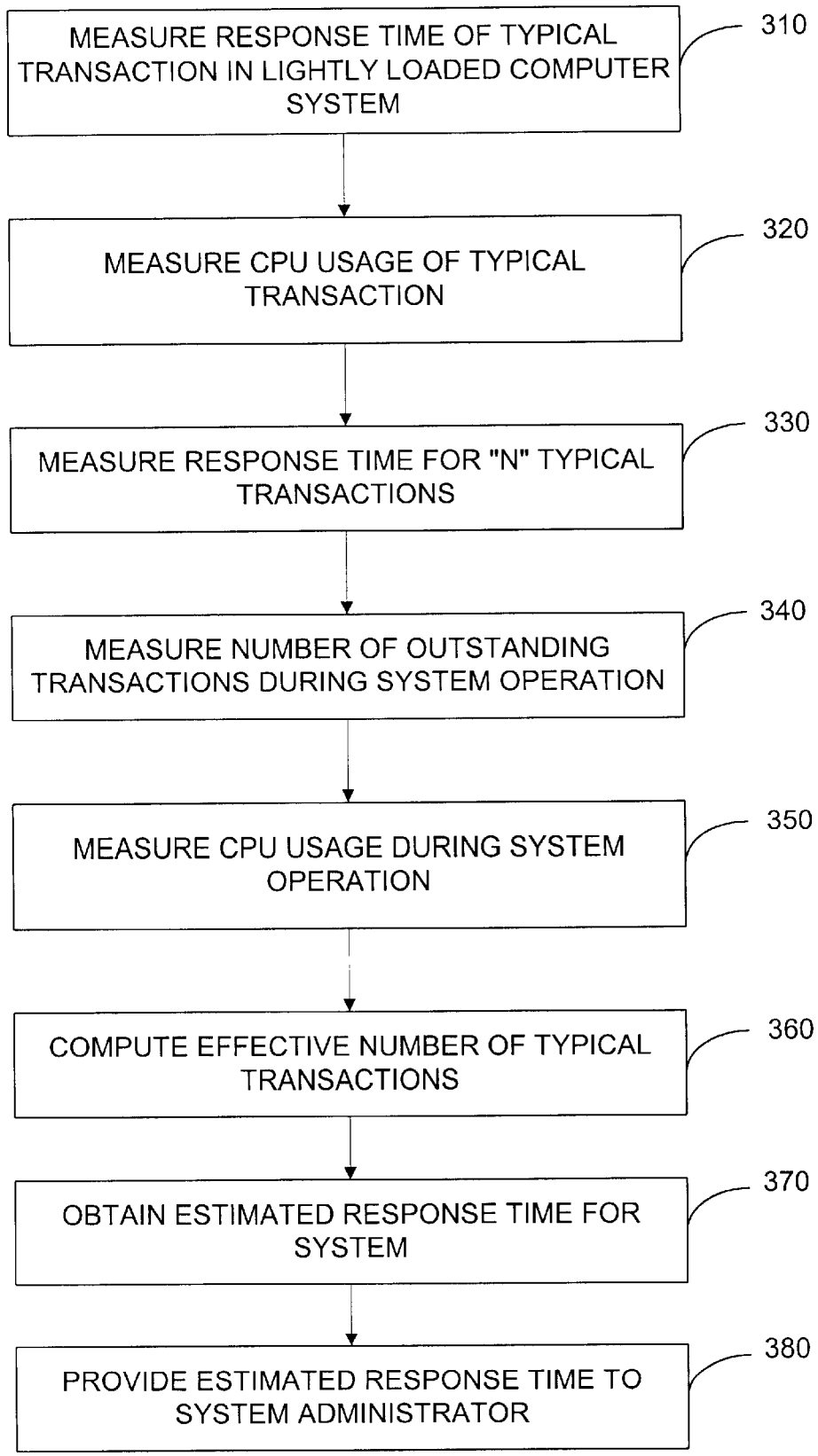
FIG. 3 is a flow chart of a method for obtaining an estimated response time for the system as described in various representative embodiments of the present patent document.

FIG. 3 is a flow chart of a method for obtaining an estimated response time for the system 100 as described in various representative embodiments of the present patent document. In block 310 the optimal response time 225 is measured, wherein the optimal response time 225 is the response time of a single typical transaction request 120 in the lightly loaded computer system 100 as described in the discussion of FIG. 2. Block 310 then transfers control to block 320.

In block 320 the first CPU usage 160, wherein the first CPU usage 160 is the CPU usage for a single typical transaction 120 is measured. Block 320 then transfers control to block 330.'

In block 330 the response time for "N", wherein "N" is greater than one, typical transactions 120 is measured. "N" is the value of second number 230 of FIG. 2 and the response time measured is the second response time 235. Block 330 then transfers control to block 340.

In block 340 the number of outstanding transaction requests during system 100 operation, not shown in the figures and also referred to as a third number 240, is counted. Block 340 then transfers control to block 350.

In block 350 the total CPU usage 180 during system 100 operation is measured. Block 350 then transfers control to block 360.

In block 360 an effective number 241 of typical transaction requests 120 for the system 100 when operating is computed. This computation could be performed, for example, by multiplying the actual number of concurrent transaction requests multiplied by the total CPU usage 180 and divided by the first CPU usage 160 (the CPU usage for a typical transaction request 120). Block 360 then transfers control to block 370.

In block 370 the estimated response time 245 for the system 100 is obtained by the intersection at third point 238 of the effective number 241 of outstanding transactions during system 100 operation and the curve 200 of FIG. 2 is obtained. Block 370 then transfers control to block 380.

In block 380 the estimated response time 245 for the operating condition of the computer system 100 is provided to a decision maker, herein also referred to as the system administrator for decision, which could be, for example, modification of computer system 100 access or parameters in order to reduce the response time to a more acceptable level. The decision could also be to make no changes.

In order to obtain more data points for a more accurate representation of the curve 200 of FIG. 2, blocks 340 and 350 would be repeated a number of times for different numbers of concurrent typical transactions 120.

3. Concluding Remarks

In representative embodiments of the method described in the present patent document, estimated response times 245 for typical transaction requests 120 under varying loads on a computer system 100 have been disclosed.

A primary advantage of the embodiments as described in the present patent document over prior methods is that the present methods can provide a more accurate approximation of actual response-time under varying loads while consuming less system resources to do so.

While the present invention has been described in detail in relation to representative embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A computer operable method for response time estimation, comprising:

measuring a first response time, wherein the first response time is the response time of a typical transaction request on a lightly loaded computer system;

measuring a first CPU capacity used by the typical transaction request;

with at least two concurrent typical transaction requests active on the computer system, wherein system is lightly loaded except for typical transaction requests,
measuring a second response time, wherein the second response time is average response time for a second number of concurrent typical transaction requests; and while system operating at a given operating load,
measuring a total CPU usage;
identifying a third number, wherein the third number is the number of concurrent transaction requests;
using the above results, obtaining an estimated response time for a typical transaction request under operational load conditions, wherein obtaining the setimated response time comprises:
computing an effective number of typical transactions, wherein the effective number of typical transactions is equal to the actual number of active transactions multiplied by the total CPU usage divided by the typical transaction CPU usage and
estimating average system response time from paired measured values of average response time for typical transactions and number of concurrently active typical transactions, wherein the effective number of typical transactions is used as the number of concurrently active typical transactions; and
reporting estimated response time.

2. A program storage medium readable by a computer, embodying a software program of instructions executable by the computer to perform response time estimation, comprising:

measuring a first response time, wherein the first response time is the response time of a typical transaction request on a lightly loaded computer system;

measuring a first CPU capacity used by the typical transaction request;

with at least two concurrent typical transaction requests active on the computer system, wherein system is lightly loaded except for typical transaction requests,
measuring a second response time, wherein the second response time is average response time for a second number of concurrent typical transaction requests; and while system operating at a given operating load,
measuring a total CPU usage;
identifying a third number, wherein the third number is the number of concurrent transaction requests;
using the above results, obtaining an estimated response time for a typical transaction request under operational load conditions, wherein obtaining the estimated response time comprises:
computing an effective number of typical transactions, wherein the effective number of typical transactions is equal to the actual number of active transactions multiplied by the total CPU usage divided by the typical transaction CPU usage and
estimating average system response time from paired measured values of average response time for typical transactions and number of concurrently active typical transactions, wherein the effective number of typical transactions is used as the number of concurrently active typical transactions; and
reporting estimated response time.

3. A computer operable method as recited in claim 1, further comprising:

specifying a value for the average system response time, wherein when this value is exceeded the computer system is considered to be significantly degraded; and when the computer system is considered to be significantly degraded, reporting that condition.

4. A computer operable method as recited in claim 3, further comprising:

when the computer system is reported to be significantly degraded, performing actions intended to prevent further response time degradation.

5. A program storage medium as recited in claim 2, further comprising:

specifying a value for the average system response time, wherein when this value is exceeded the computer system is considered to be significantly degraded; and when the computer system is considered to be significantly degraded, reporting that condition.

6. A program storage medium as recited in claim 5, further comprising:

specifying a value for the average system response time, wherein when this value is exceeded the computer system is considered to be significantly degraded; and when the computer system is considered to be significantly degraded, reporting that condition.

* * * * *

UNITED STATES PATENT AND TRADEMARK OFFICE
CERTIFICATE OF CORRECTION

PATENT NO.    : 6,671,658 B2
DATED         : December 30, 2003
INVENTOR(S)   : Thomas E. Turicchi et al.

It is certified that error appears in the above-identified patent and that said Letters Patent is hereby corrected as shown below:

Column 3,
Line 44, delete "is" and insert therefor -- in --

Column 5,
Line 50, delete "setimated" and insert therefor -- estimated --

Signed and Sealed this

First Day of February, 2005

JON W. DUDAS
*Director of the United States Patent and Trademark Office*